United States Patent [19]

Miyake et al.

[11] 4,406,870

[45] Sep. 27, 1983

[54] METHOD FOR THE SEPARATION OF CARBON ISOTOPES BY CHEMICAL EXCHANGE METHOD

[75] Inventors: Tetsuya Miyake, Tokyo; Kunihiko Takeda; Heiichiro Obanawa, both of Yokohama, all of Japan

[73] Assignee: Asahi Kasei Kogyo Kabushiki Kaisha, Osaka, Japan

[21] Appl. No.: 293,220

[22] PCT Filed: Dec. 2, 1980

[86] PCT No.: PCT/JP80/00326

§ 371 Date: Aug. 10, 1981

§ 102(e) Date: Aug. 10, 1981

[87] PCT Pub. No.: WO81/01802

PCT Pub. Date: Jul. 9, 1981

[30] Foreign Application Priority Data

Dec. 27, 1979 [JP] Japan .............................. 54-170780
Mar. 15, 1980 [JP] Japan .............................. 55-32858

[51] Int. Cl.$^3$ .............................................. C01B 31/00
[52] U.S. Cl. ................................... 423/445; 210/681; 210/682; 210/690; 423/DIG. 7
[58] Field of Search ................. 423/445, DIG. 7; 210/681, 682, 690

[56] References Cited

U.S. PATENT DOCUMENTS 3,535,079 10/1970 Palko .
3,607,010 6/1971 Brown .
3,627,487 8/1971 Jepson .

FOREIGN PATENT DOCUMENTS 2235849 7/1971 Fed. Rep. of Germany .

Primary Examiner—O. R. Vertiz
Assistant Examiner—Jackson Leeds
Attorney, Agent, or Firm—Birch, Stewart, Kolasch & Birch

[57] ABSTRACT

A method for the separation of the isotopes of carbon comprising contacting an aqueous solution containing an acid-dissociated type chemical species of a carbon-containing acid and a non-dissociated type chemical species of said acid with an anion exchange resin as a solid phase, thereby to allow an isotope exchange reaction with respect to carbon to proceed between said acid-dissociated type chemical species and said non-dissociated type chemical species and, concurrently, to adsorb said acid-dissociated type chemical species on said anion exchange resin, and separate $C^{12}$ and $C^{13}$ respectively into a solution phase and the solid phase or the solid phase and a solution phase, whereby $C^{13}$ is concentrated. This method can be practised at an extremely favorable efficiency and inexpensive cost, as compared with the prior art method for the separation utilizing a distillation method or a chemical exchange method between gas—liquid phases, gas—solution phases, solution—solution phases and the like.

9 Claims, No Drawings

METHOD FOR THE SEPARATION OF CARBON ISOTOPES BY CHEMICAL EXCHANGE METHOD

FIELD OF THE INVENTION

This invention relates to a new method for the separation of carbon isotopes. More particularly, it is concerned with a method for the separation of the isotopes of carbon utilizing an isotope exchange reaction with respect to carbon between a dissociated type chemical species of a carbon-containing acid and a non-dissociated type chemical species of said acid wherein the desired carbon isotope is separated and concentrated in one of the below-mentioned phases by the separation between a solid phase and a solution phase using an anion exchange resin.

DESCRIPTION OF THE PRIOR ART

Naturally existing carbon is a mixture of about 98.89% by weight of carbon possessing a mass number of 12 ($C^{12}$) with about 1.11% of carbon possessing a mass number of 13 ($C^{13}$).

$C^{13}$ has been employed for labeling of chemical compounds in various fileds such as clinical medicine, pharmaceutics, biochemistry, agriculture or the like by using its nonradioactivity and, hence, the need for $C^{13}$ has been highly increased. Consequently, the development of a technique for more efficient separation of $C^{13}$ at a higher concentration has been desired in various fields.

The main methods for the separation of $C^{13}$ presently utilized comprise a condensing distillation method, a thermal diffusion method, a chemical exchange method and a laser method. Even the condensing distillation method, which has been at present regarded as the leading one among those methods, requires a considerably expensive cost for the separation, which leads to a hindrance in the availability of $C^{13}$.

The chemical exchange method, on the other hand, utilizes an isotope exchange reaction with respect to carbon between different carbon-containing chemical species. More specifically, an isotope exchange reaction with respect to carbon as represented by the following chemical equation (1) can occur between different carbon-containing chemical species, CX and CY, and, in a case where its equilibrium constant deviates from 1, contact of both chemical species can provide concentration of $C^{13}$ in one of both chemical species.

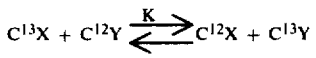
(1)

There have been hitherto known various combinations of chemical species capable of producing such an isotope effect.

However, all previous chemical exchange methods have been limited to those utilizing an isotope exchange reaction between a gas phase and a liquid phase, between a gas phase and a solution phase, or between a solution phase and a solution phase. In the case where an isotope exchange reaction between a gas phase and a liquid phase or between a gas phase and a solution phase is to be utilized, the reaction efficiency becomes significantly lower because of exchange performed solely on a gaseous surface. Also, in the case of an isotope exchange reaction between two solution phases, separation of different chemical species is troublesome and the process for multiplying isotope exchange reactions tends to be complicated in order to attain the desired isotope at a highly concentrated level. Therefore, the current chemical exchange methods have not improved on the condensing distillation method. On the other hand, the condensing distillation method basically involves major problems in an economical aspect owing to a heavy energy consumption.

DISCLOSURE OF THE PRESENT INVENTION

This invention provides a method for the separation of carbon isotopes by a chemical exchange method, which may concentrate $C^{13}$ with a higher separation efficiency in comparison with the prior art methods. More particularly, the invention employs an aqueous solution containing an acid-dissociated type chemical species and a non-dissociated type chemical species of a carbon-containing acid as different carbon-containing chemical species, contacts said aqueous solution with an anion exchange resin as a solid phase, thereby effecting an isotope exchange reaction between said acid-dissociated chemical species and said non-dissociated chemical species. Concurrently said acid-dissociated chemical species is adsorbed on said anion exchange resin and the carbon isotope is separated into one of the phases.

The acid-dissociated type chemical species exhibits a strong adsorptivity to the anion exchange resin because of the chemical species having a negative charge, while the non-dissociated type chemical species is difficulty adsorbed onto the anion exchange resin, whereupon it is practicable to separate both chemical species preferably.

The term "a solid phase" as used herein is meant to include an acid-dissociated type chemical species having been adsorbed on the anion exchange resin as a solid phase.

In the case where a carbon-containing acid is represented as CXH and its acid-dissociated type chemical species as $CX^-$, an isotope exchange reaction with respect to carbon between an acid-dissociated type chemical species and a non-dissociated type chemical species may be represented by the following chemical equation.

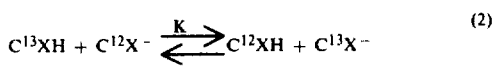
(2)

(wherein K represents an equilibrium constant for isotope exchange)

Therefore, it is possible to separate $C^{13}$ into the anion exchange resin (a solid phase) if K is more than 1 and into a solution phase if K is less than 1.

Accordingly, there is provided in the basic embodiment of this invention a method for the separation of the isotopes of carbon, $C^{12}$ and $C^{13}$, comprising effecting an isotope exchange reaction with respect to carbon between a dissociated type chemical species of a carbon-containing acid and a non-dissociated type chemical species of said acid, characterized in that an aqueous solution containing an acid-dissociated type chemical species of a carbon-containing acid and a non-dissociated type chemical species of said acid is contacted with an anion exchange resin as a solid phase to adsorb the dissociated type chemical species onto the anion exchange resin, while allowing an isotope exchange reaction with respect to carbon to proceed between the dissociated type chemical species and the non-dissociated type chemical species, thereby separating $C^{12}$ and $C^{13}$, respectively, into a solution phase and the solid phase or the solid phase and a solution phase, whereby $C^{13}$ is concentrated in the phase into which $C^{13}$ is to be separated.

If isotopes are to be separated between a solid phase and a solution phase and the non-dissociated type chemical species coexists in a solid phase and the acid-dissociated type chemical species in a solution phase, it is believed that an apparent equilibrium constant for isotope exchange reaction may be less than K. Then, if a total concentration of the carbon-containing chemical species in a solid phase is defined as C and a total concentration of the carbon-containing chemical species in a solution phase as $\overline{C}$, the isotope exchange reaction in this instance may be represented by the following chemical equation wherein K' is a practically effective equilibrium constant for isotope exchange between a solid phase and a solution phase

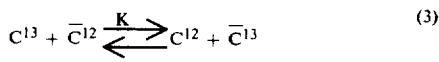
(3)

The present inventors have found that ratios of the acid-dissociated type chemical species and the non-dissociated type chemical species present in a solution phase may be determined by the pH of the solution phase, while ratios of both chemical species present in a solid phase are also dependent upon pH of the solution phase. Hence, the preferred K' for isotope separation, defined as $0.3 < K'/K < 1$, can be maintained if pH is adjusted to a range meeting the following condition with regard to pKa of the carbon-containing acid employed ($-\log$ Ka when an acid dissociation constant is defined as Ka).

$$\sqrt{pKa} < pH < pKa \quad (4)$$

The more preferable condition for pH is to satisfy the following equation, $$\sqrt{pKa} + 1 < pH < pKa - 1 \quad (5)$$

Under the latter condition, K'/K is shown by the formula $0.7 < K'/K < 1$.

The anion exchange resins which may be employed in this invention may include the below-mentioned ones.

Namely, there may be utilized a non-crosslinking polymerizable monomer a styrene derivative such as styrene, methylstyrene, dimethylstyrene, 3, 4, 6-trimethylstyrene, methoxystyrene, bromostyrene, cyanostyrene, fluorostyrene, dichlorostyrene, N,N-dimethylaminostyrene, nitrostyrene, chloromethylstyrene, trifluorostyrene, trifluoromethylstyrene, aminostyrene and the like, a vinyl sulfide derivative such as methylvinyl sulfide, phenylvinyl sulfide and the like, an acrylonitrile derivative such as acrylonitrile, methacrylonitrile, α-acetoxyacrylonitrile and the like, a vinyl ketone such as methyl vinyl ketone, ethyl isopropyl ketone and the like, a vinylidene compound such as vinylidene chloride, vinylidene bromide, vinylidene cyanide and the like, an acrylamide derivative such as acrylamide, methacrylamide, N-butoxymethylacrylamide, N-phenylacrylamide, diacetone acrylamide, N,N-dimethylaminoethyl acrylamide and the like, N-vinyl-succinimide, N-vinylpyrrolidone, N-vinylphthalimide, N-vinylcarbazole, vinylfuran, 2-vinylbenzofuran, vinylthiophenone, vinylimidazole, methylvinylimidazole, vinylpyrazole, vinyloxazolidone, vinylthiazole, vinyltetrazole, vinylpyridine, methylvinylpyridine, 2,4-dimethyl-6-vinyltriazine, vinylquinoline, epoxybutadiene and the like.

As a cross-linking polymerizable monomer, there may be utilized divinylbenzene, divinyltoluene, divinylxylene, divinylnaphthalene, divinylethylbenzene, divinylphenanthrene, trivinylbenzene, divinyldiphenyl, divinyldiphenylmethane, divinylbenzyl, divinylphenyl ether, divinyldiphenyl sulfide, divinyldiphenylamine, divinylsulfone, divinyl ketone, divinylfuran, divinylpyridine, divinylquinoline, diallyl phthalate, diallyl maleate, diallyl fumarate, diallyl succinate, diallyl oxatate, diallyl adipate, diallylamine, triallylamine, N,N'-ethylene diacrylamide, N,N'-methylene diacrylamide, N,N'-methylene dimethacrylamide, ethylene glycol dimethacrylate, triethylene glycol dimethacrylate, polyethylene glycol dimethacrylate and the like.

As the preferred resin composition which may be employed in this invention, there may be utilized a product obtained by chloromethylation and subsequent amination of a cross-linked high molecular compound, which is synthesized by addition copolymerization of styrene, vinyltoluene, ethylvinylbenzene and the like with divinylbenzene as main components, a product obtained by amination of an addition copolymer comprising as main components a monomer with a functional group such as chloromethylstyrene, epoxybutadiene, acrylamide and the like and a cross-linking monomer such as divinylbenzene, triallylisocyanurate and the like, a product comprising as main components a monomer with a nitrogen atom capable of forming an exchange group such as N-vinylphthalamine, vinylimidazole, vinylpyridine, vinyltetrazole, vinylquinoline, divinylpyridine and the like and, if necessary, copolymerized with a cross-linking polymerizable monomer.

As the amine which may be employed for the amination, there may be utilized an aliphatic amine such as triethanolamine, triethylamine, trimethylamine, triallylamine, diethanolamine, diallylamine, diethylamine, dimethylamine, 2-aminoethanol, ethylamine, methylamine, ethanolamine and the like, an aromatic amine such as aniline, o-aminophenol, N,N-dimethylaniline, N-methylaniline, m-toluidine, p-toluidine, p-aminophenol, diphenylamine and the like, a heterocyclic amine such as pyridine, γ-picoline, piperidine, pyrazine, piperazine, indoline, indole, imidazole, 2-methylimidazole, quinoline, 2,6-lutidine, 1, 2, 3, 4-tetrahydroquinoline, N-methylpyrrolidine, benzotriazole and the like.

For the preparation of the anion exchange resin employable in the present method from the above-recited respective components, there may be adopted any methods commonly used in the art, but they will be more illustratively explained hereinbelow.

A polymerization reaction is carried out by adding a polymerization initiator to a mixture of the non-crosslinking polymerizable monomer at 6 to 98% by weight, preferably 10 to 90% by weight, more preferably 20 to 80% by weight with the crosslinking polymerizable monomer at 2 to 94% by weight, with regard to a total weight of said non-crosslinking polymerizable monomer and said cross-linking polymerizable monomer.

The polymerization initiator may include a peroxide such as benzoyl peroxide, methyl ethyl ketone peroxide and the like, an azo compound such as azobisisobutyronitrile, 2-cyano-2-propylazoformamide and the like. The amount of the polymerization initiator to be added is 0.01 to 12% by weight, preferably 0.1 to 5% by weight, more preferably 0.2 to 3% by weight, based on the total weight of said monomers.

A polymerization temperature may be usually in the range of 0° C. to 200° C., preferably 15° C. to 160° C., more preferably 30° C. to 130° C.

A polymerization time may be usually in the range of 30 minutes to 50 hours, preferably 1 hour to 30 hours, more preferably 2 hours to 20 hours.

After completion of the polymerization, the product is cooled, washed with methanol and a large excess amount of water and then dried. Thereafter, chloromethylation is effected by introducing the product into chloromethyl methyl ether. A reaction temperature for the chloromethylation is usually 2° C. to 10° C., while a reaction time is 1 hour to 80 hours, preferably 10 hours to 60 hours.

In the amination, the polymer prepared as stated above is subjected to an amination reaction in a 5% to 40% ethanolic solution of the particular amine to be used for the amination. An amination reaction temperature is usually 20° C. to 80° C. and a reaction time is usually 10 minutes to 10 hours.

The anion exchange resin which may be employed in the present method may be preferably in the dissociated state with respect to a large portion thereof under the pH condition of a solution phase. The present inventors have found that when $pKa_R$ of the anion exchange resin ($-\log Ka_R$ where an acid dissociation constant of said resin is defined as $Ka_R$) is taken, the following condition should be essential between pH of a solution phase and said anion exchange resin in order to dissociate not less than 99% of said resin.

$$pKa_R > pH + 2$$

In fact, the $pKa_R$ value for said anion exchange resin can be determined as shown below. First, 10 g (dry weight basis) of the anion exchange resin to be employed is converted to its Cl⁻ adsorption form by the coexistence of 100 cc of a 0.1 M/l aqueous solution of hydrochloric acid. A 0.1 M/l aqueous solution of sodium hydroxide is added dropwise thereto with 0.1 cc portions and the pH of each of the resultant solutions is measured. The pH value at an inflexion point in the thereby obtained titration curve is defined as $pKa_R$ for the anion exchange resin, on condition that $pKa_R$ value of a strongly basic anion exchange resin having a quaternary amine as an exchange group is defined as over 14.

As the carbon-containing acid to be employed, there may be utilized an organic acid such as formic acid, acetic acid, lactic acid, butyric acid, oxalic acid, citric acid, succinic acid and the like and an inorganic acid such as carbonic acid, hydrogen cyanide, cyanic acid, thiocyanic acid and the like.

In view of the requirement that an equilibrium constant for isotope exchange should be greater between an acid-dissociated type chemical species and a non-dissociated type chemical species, carbonic acid, hydrogen cyanide, cyanic acid, thiocyanic acid and formic acid are preferable among these carbon-containing acids, with carbonic acid being particularly preferable.

The concentration of the acid to be employed is preferably 0.01 to 0.9 M/l.

The instance wherein carbonic acid is used as a carbon-containing acid will be illustrated below.

In case that carbonic acid is used, a bicarbonate ion ($HCO_3^-$) and a dissolved $CO_2$ may be applied as an acid-dissociated type chemical species and a non-dissociated type chemical species, respectivey. Since the primary acid dissociation constant for carbonic acid is $10^{-6.3}$ at 25° C. (pKa=6.3), the condition can be provided wherein $CO_2$ is dominant in a solution phase and $HCO_3^-$ is dominant in a solid phase, if pH of a solution is maintained within $3.5 < pH < 5.3$.

Heretofore, H. C. Urey et al (The Journal of Chemical Physics, Vol. 11, No. 9, September, 1943, pages 403–412) have already measured the equilibrium constant for isotope exchange K between $HCO_3^-$ and $CO_2$ and it is 1.013 to 1.014 at 25° C.

$$HC^{12}O_3^- + C^{13}O_2 \xrightleftharpoons{K} HC^{13}O_3^- + C^{12}O_2 \qquad (6)$$

Accordingly, $C^{13}$ can be concentrated into a solid phase in the present method.

Next, procedures for conducting the present method will be illustrated below. Procedures may be divided roughly into a batchwise operation and a chromatography operation.

In every operation, a preferable separation efficiency can be attained by keeping a reaction temperature at 0° C. to 150° C. Where carbonic acid is selected as a carbon-containing acid, a particularly preferable separation efficiency can be attained at a reaction temperature of 20° C. to 90° C. Moreover, in case of carbonic acid being used as a carbon-containing acid, a separation efficiency can be much more improved because of increase in the dissolved $CO_2$ amount in a solution phase and consequent increase in a collision frequency between $CO_2$ and $HCO_3^-$, if reaction systems of a resin phase and a solution phase are placed under a pressure ranging from 1 kg/cm²—gauge to 30 kg/cm²—gauge.

A method for the separation of the isotopes of carbon by said batchwise operation is to dissolve a carbon-containing acid or its salt such as sodium salt, potassium salt, ammonium salt, lithium salt and the like in water, add an anion exchange resin thereto, adjust pH of a solution phase to a value as defined in the above equation (4), more preferably the above equation (5), with an acid such as hydrochloric acid, sulfuric acid and the like or an alkali such as sodium hydroxide, potassium hydroxide and the like and stir thoroughly, whereby an equilibrium for isotope exchange is reached. Thereafter, a solid phase and a solution phase are separated by means of a filter.

Generally, in case that K in the above equation (2) is more than 1, $C^{13}$ is concentrated into a solid phase and then the chemical species adsorbed as an acid-dissociated type is released as a non-dissociated type by the supply of an acid such as hydrochloric acid or sulfuric acid and recovered. On the other hand, in case that K in the above equation (2) is less than 1, $C^{13}$ is concentrated into a solution phase and then said solution phase portion is recovered.

Of the operations for practicing the present method in which an acid-dissociated type chemical species of a carbon-containing acid and a non-dissociated type chemical species of said acid are employed in combination with an anion exchange resin, the most advantageous method consists in multiplying isotopic exchange reactions between a solid phase and a solution phase by a chromatography operation as explained below. This is to utilize an interconversion between said acid-dissociated type chemical species and said non-dissociated type chemical species, depending upon pH of a solution. In other words, this is to utilize the fact that said acid-dissociated type chemical species becomes dominant at a higher pH range than pKa value of the acid employed, while said non-dissociated type chemical species becomes dominant at a lower pH range.

For example, an anion exchange resin is packed into a column and said anion exchange resin is converted to its $OH^-$ adsorption form by the supply of an aqueous solution of such alkali as sodium hydroxide or potassium hydroxide (a $OH^-$ concentration is about 0.01 to about 0.9 M/l) to a resin bed in 10 to 20 times amount of a packed volume of said resin. Then, an aqueous solution of a non-dissociated type of a carbon-containing acid is fed into the column from the upper portion thereof. At this point, said non-dissociated type chemical species is adsorbed on an anion exchange resin as an acid-dissociated type chemical species converted by the reaction with the $OH^-$ adsorbed on said resin bed. Successively, an aqueous solution of an acid such as sulfuric acid or hydrochloric acid, which possesses a $H^+$ concentration to show a sufficiently lower pH than pKa of the carbon-containing acid to be applied, is fed thereinto. At this point, the absorbed acid-dissociated type chemical species is again converted to the non-dissociated type chemical species, which is then released from the anion exchange resin. The so released non-dissociated type chemical species flows downwards through a solution phase to reach a $OH^-$ adsorbed band wherein said species is then again converted to the acid-dissociated type chemical species and adsorbed.

Thus, an acid-dissociated type chemical species is present in a solid phase and a non-dissociated type chemical species is in a solution phase, within the band on which the acid-dissociated type chemical species is adsorbed, and then a continuous contact of both chemical species can be accomplished by the supply of an acid.

As explained above, the separation of the isotopes of carbon can be extremely efficiently effected by the multiplication of isotopic exchange reactions between solid-solution phases using a chromatography operation.

BEST MODE OF CARRYING OUT THE INVENTION

This invention is illustrated by way of examples for more detailed description.

REFERENCE EXAMPLE 1

100 cc of a 0.03 M/l $NaHCO_3$ aqueous solution were admixed with 10 g (dry basis) of a strongly basic resin produced by the reaction of a base polymer, chloromethylated polystyrene beads using divinyl benzene as a cross linking agent, with trimethylamine and stirring was made for 5 minutes while maintaining at 25° C.

After $HCO_3^-$ was brought to an adsorption equilibrium, the pH of the solution was adjusted to various values by the dropwise addition of $H_2SO_4$. Stirring was continued over 30 minutes so that an isotopic exchange equilibrium was gained and subsequently a resin phase was separated from a solution phase by means of a filter.

The $HCO_3^-$ adsorbed on the resin was released in the form of $CO_2$ by washing with 0.1 M/l sulfuric acid and collected as a solution in 0.1 M/l sodium hydroxide solution.

A ratio of the carbon isotopes in the resin and the solution was measured by means of an electron-bombardment type mass spectrometer (manufactured by Shimadzu Corp., Japan: Type GCM5 7000) and K' values as shown below were determined.

| pH | $\overline{C^{13}/C^{12}}$ ($\times 10^2$) | $C^{13}/C^{12}$ ($\times 10^2$) | K' |
|---|---|---|---|
| 2.0 | 1.166 | 1.1654 | 1.0005 |
| 2.5 | 1.171 | 1.165 | 1.005 |
| 3.0 | 1.170 | 1.163 | 1.006 |
| 3.5 | 1.172 | 1.158 | 1.012 |
| 4.0 | 1.173 | 1.158 | 1.013 |
| 4.5 | 1.172 | 1.158 | 1.012 |
| 5.0 | 1.172 | 1.159 | 1.011 |
| 5.3 | 1.170 | 1.158 | 1.010 |
| 5.5 | 1.170 | 1.162 | 1.007 |
| 6.0 | 1.169 | 1.163 | 1.005 |
| 6.3 | 1.170 | 1.164 | 1.005 |
| 7.0 | 1.168 | 1.165 | 1.003 |

It can be seen from the above presented K' values that a practically preferred isotope exchange equilibrium constant between a solid and a solution can be obtained by the adjustment of pH to, preferably, 2.5 to 6.3 and, more preferably, 3.5 to 5.3.

In this invention, $_pH$ value was measured by means of a digital $_pH$ meter Type 701A manufactured by Orion Co., Ltd., U.S.A.

REFERENCE EXAMPLE 2

Into a 10—liter four-necked flask equipped with a stirrer and a thermometer were introduced 3000 g of water, 20 g of sodium polyacrylate and 82 g of sodium chloride as a suspending agent, 900 g of styrene, 35 g of ethyl vinyl benzene, 65 g of divinylbenzene, and as polymerization solvents, 380 g of methyl benzoate, 320 g of isoamyl alcohol, 1100 g of n-heptane and 14 g of azobisisobutyronitrile and thorough stirring was effected to disperse oil droplets. This mixture was subjected to polymerization at 70° C. over 28 hours. After completion of the polymerization, it was cooled, a resin was placed into a washing tower with filters and then washed well with 10 liters of methanol and a large excess amount of water.

After washing, the resin was dried at 40° C. under 2 mmHg for 72 hours, and 300 g of the resin thus dried were introduced into 3 liters of chloromethyl methyl ether while maintained at 5° C. Chloromethylation was conducted by reaction using 450 g of zinc chloride as a catalyst over 48 hours and, successively, amination was accomplished in a 20% ethanolic solution of trimethylamine at 40° C. over 5 hours to afford a strongly basic anion exchange resin ($_pKa_R > 14$).

REFERENCE EXAMPLE 3

Into a 5—liter four-necked flask equipped with a stirrer and a thermometer were placed 3000 g of water and 4 g of sodium polyacrylate and 12 g of sodium chloride as a suspending agent were dissolved thereinto and stirred. Then, 250 g of styrene having dissolved therein 2 g of benzoyl peroxide, 20 g of ethyl vinyl benzene, 30 g of divinylbenzene and, as a polymerization solvent, 138 g of triol were added thereto and thorough stirring was effected to disperse oil droplets.

Polymerization was carried out at 70° C. over 28 hours. After completion of the polymerization, it was cooled and placed into a washing tower with filters, through which 20 liters of methanol and a large excess amount of water were passed to thoroughly wash the thereby produced resin. After washing, the resin was dried by means of a vacuum drier at 40° C. under 2 mmHg for 16 hours.

To 2 liters of chloromethyl methyl ether while maintained at 5° C. were added 120 g of the resin thus dried. Chloromethylation was effected by reaction using 250 g of zinc chloride as a catalyst over 48 hours and, successively, amination was done in a 15% ethanolic solution of diethylamine at 70° C. over 30 minutes to afford an anion exchange resin ($_pKa_R = 8.0$ at 25° C.).

EXAMPLE 1

Into a Pyrex glass cylindrical column with an internal diameter of 8 mm and a height of 1000 mm was packed the strongly basic ion exchange resin ($_pKa_R > 14$) prepared in Reference Example 2 to form a resin bed with a height of 900 mm. As the carbon-containing acid, there was employed carbonic acid ($_pKa = 6.3$ at 25° C.). Approximately 1000 cc of a 0.1 M/l NaOH aqueous solution at 25° C. were fed thereinto, thereby the anion exchange resin was converted to its $OH^-$ adsorption form. Subsequently, 300 cc of an aqueous solution of $CO_2$ saturated and dissolved under a pressure of 1 kg/cm$^2$—gauge were supplied thereto. The dissolved $CO_2$ was converted to $HCO_3^-$ by reaction with the adsorbed $OH^-$ and in turn adsorbed on the resin to form $HCO_3^-$ adsorption bands.

Thereafter, an aqueous solution of 0.03 M/l $H_2SO_4$ was fed into the column at a flow rate of 4.5 cc/min. at the upper portion thereof. The adsorbed $HCO_3^-$ was released in the form of $CO_2$, which flew downwards through a solution phase to contact with the $OH^-$ adsorption band and it was reconverted to $HCO_3^-$ and re-adsorbed thereon.

A $HCO_3^-$ adsorption band portion descended with a continuous supply of $H_2SO_4$, whereby $C^{13}$ was gradually concentrated at the upper portion of the $HCO_3^-$ adsorption band.

After the $HCO_3^-$ adsorption band reached the lowest end of the column, $CO_2$ as eluted was collected as its salt form in 0.1 M/l NaOH at intervals of 5 minutes and then a ratio of carbon isotopes was measured by means of the above-mentioned electron-bombardment type mass spectrometer.

Elapsed time (Developing time) from start of the $H_2SO_4$ aqueous solution supply and ratio of isotopes in the eluted $CO_2$ are as shown below.

| Developing time (min.) | $C^{13}/C^{12}$ ($\times 10^2$) |
|---|---|
| 205.0 | 1.163 |
| 210.0 | 1.167 |
| 215.0 | 1.183 |
| 220.0 | 1.199 |
| 225.0 | 1.256 |
| 230.0 | 1.298 |

The pH value as measured in a solution phase of the adsorbed band was 3.9.

EXAMPLE 2

Into a Pyrex glass cylindrical column with an internal diameter of 8 mm and a height of 1000 mm was packed the same strongly basic ion exchange resin as used in the Example 1 to form a resin bed with a height of 900 mm. As the carbon-containing acid, there was employed carbonic acid (pKa = 6.3 at 25° C.). Approximately 1000 cc of a 0.1 M/l NaOH aqueous solution at 25° C. were fed thereinto, thereby the anion exchange resin was converted to its $OH^-$ adsorption form. Subsequently, 40 cc of an aqueous solution of $CO_2$ dissolved under a pressure of 10 kg/cm$^2$—gauge were supplied thereto, whereby a $HCO_3^-$ adsorption band was formed.

Thereafter, an aqueous solution of 0.2 M/l $H_2SO_4$ was fed into the column at a flow rate of 3.5 cc/min at the upper portion thereof.

After the $HCO_3^-$ adsorption band reached the lowest end of the column, $CO_2$ as eluted was collected as its salt form in 0.2 M/l NaOH at intervals of 1 minute and then a ratio of carbon isotopes was measured by means of the above-mentioned electron-bombardment type mass spectrometer.

Developing time and ratio of carbon isotopes as measured are shown below.

| Developing time (min.) | $C^{13}/C^{12}$ ($\times 10^2$) |
|---|---|
| 42.5 | 1.165 |
| 43.5 | 1.183 |
| 44.5 | 1.226 |
| 45.5 | 1.274 |
| 46.5 | 1.361 |
| 47.5 | 1.382 |

Further, the pH of a solution phase within $HCO_3^-$ adsorption band as measured at this point was 3.7.

EXAMPLE 3

Into a Pyrex glass cylindrical column with an internal diameter of 8 mm and a height of 1000 mm was packed the anion exchange resin prepared in the Reference Example 3 (pKa = 8.0 at 25° C.) to form a resin bed with a height of 900 mm.

As the carbon-containing acid, there was employed carbonic acid ($_pKa = 6.3$ at 25° C.).

Approximately 1000 cc of a 0.1 M/l NaOH aqueous solution at 25° C. were fed thereinto, thereby the anion exchange resin was converted to its $OH^-$ adsorption form. Subsequently, 35 cc of an aqueous solution of $CO_2$ dissolved under a pressure of 12 kg/cm$^2$—gauge were supplied thereto, whereby a $HCO_3^-$ adsorption band was formed. Thereafter, a 0.2 M/l $H_2SO_4$ aqueous solution was fed into the column at a flow rate of 4.0 cc/min at the upper portion thereof.

After the $HCO_3^-$ adsorption band reached the lowest end of the column, $CO_2$ as eluted was collected as its salt form in 0.2 M/l NaOH at intervals of 1 minute and then a ratio of carbon isotopes was measured by means of the above-mentioned electron-bombardment type mass spectrometer.

Developing time and ratio of carbon isotopes as measured are shown below.

| Developing time (min.) | $C^{13}/C^{12}$ ($\times 10^2$) |
|---|---|
| 34.0 | 1.165 |
| 35.0 | 1.173 |
| 36.0 | 1.207 |
| 37.0 | 1.249 |
| 38.0 | 1.333 |
| 39.0 | 1.393 |

Further, the pH of a solution phase with with $HCO_3^-$ adsorption band as measured was 4.0.

PROBABILITY OF UTILIZATION IN INDUSTRY

As stated hereinabove, the method for the separation of carbon isotopes through a carbon isotope exchange reaction between a solid phase and a solution phase according to this invention is extremely efficient and capable of inexpensively separating and concentrating $C^{13}$, as compared with separation methods between a gas phase and a liquid phase, between a gas phase and a solution phase or between a solution phase and a solution phase according to the chemical exchange method in the prior art. Therefore, the future utility and value of the present invention is very high since the need for $C^{13}$ has increased more as a tracer in a variety of fields, such as clinical medicine, pharmaceutics, biochemistry, agriculture or the like.

What is claimed is:

1. A method for the separation of the isotopes of carbon, $C^{12}$ and $C^{13}$, comprising effecting an isotope exchange reaction with respect to carbon between a dissociated type chemical species of a carbon-containing acid and a non-dissociated type chemical species of said acid, wherein an aqueous solution of a dissociated type chemical species of a carbon-containing acid and a non-dissociated type chemical species of said acid are contacted with an anion exchange resin as a solid phase to adsorb the dissociated type chemical species of the anion exchange resin, while allowing an isotope exchange reaction with respect to carbon to proceed between the dissociated type chemical species and the non-dissociated type chemical species, thereby separating $C^{12}$ and $C^{13}$, respectively, into a solution phase and the solid phase if an equilibrium constant K for an isotope exchange reaction represented by $$C^{13}XH + C^{12}X^- \underset{}{\overset{K}{\rightleftarrows}} C^{12}XH + C^{13}X^-$$

wherein K represents an equilibrium constant for isotope exchange, CXH represents a carbon-containing acid and $CX^-$ represents an acid-dissociated type chemical species of the carbon-containing acid is more than 1 or separate $C^{12}$ and $C^{13}$, respectively, into the solid phase and a solution phase if K as defined above is less than 1, whereby $C^{13}$ is concentrated in the phase into which $C^{13}$ is separated.

2. A method for the separation of the isotopes of carbon according to claim 1, characterized in that pKa of the above-mentioned carbon-containing acid defined as —log Ka when an acid dissociation constant of said carbon-containing acid is defined as Ka and pH of said solution phase satisfy the following relation, $$\sqrt{pKa} < pH < pKa$$

3. A method for the separation of the isotopes of carbon according to claim 1 or 2, characterized in that $pKa_R$ of the above-mentioned anion exchange resin defined as —log $Ka_R$ when an acid dissociation constant of said anion exchange resin is defined as $Ka_R$ and pH of said solution phase satisfy the following relation, $$pKa_R > pH + 2.$$

4. A method for the separation of the isotopes of carbon according to claim 2, characterized in that pKa of the carbon-containing acid as defined above and pH of said solution phase satisfy the following relation,

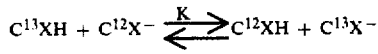
$$\sqrt{pKa} + 1 < pH < pKa - 1.$$

5. A method for the separation of the isotopes of carbon according to claim 1, characterized in that carbon isotope exchange reactions between solid-solution phases are multiplied by a chromatography operation which comprises repeating the steps of effecting contact of an aqueous solution containing an acid-dissociated type chemical species of a carbon-containing acid and a non-dissociated type chemical species of said acid with said anion exchange resin by supplying a solution containing a non-dissociated type chemical species to a bed of an anion exchange resin in a $OH^-$ adsorbed form packed into a column from the upper portion thereof, thereby to form an adsorbed band of said acid-dissociated type chemical species on said resin; and of subsequently releasing the acid-dissociated type chemical species adsorbed on said resin as the non-dissociated type chemical species again by supplying an acid to said anion exchange resin bed from the upper portion thereof.

6. A method for the separation of the isotopes of carbon according to claim 1 wherein said carbon-containing acid is carbonic acid.

7. A method for the separation of the isotopes of carbon according to claim 6, characterized in that said contact of an aqueous solution containing an acid-dissociated type chemical species of a carbon-containing acid and a non-dissociated type chemical species of said acid with an anion exchange resin is effected under a pressure of 1 kg/cm²—gauge to 30 kg/cm²—gauge.

8. A method for the separation of the isotopes of carbon according to claim 1, characterized in that said contact of an aqueous solution containing an acid-dissociated type chemical species of a carbon-containing acid and a non-dissociated type of said acid with an anion exchange resin is effected at 0° C. to 150° C.

9. A method for the separation of the isotopes of carbon according to claim 6 or 7, characterized in that said contact of an aqueous solution containing an acid-dissociated type chemical species of a carbon-containing acid and a non-dissociated type chemical species of said acid with an anion exchange resin is effected at 20° C. to 90° C.

* * * * *